United States Patent [19]

Eimer et al.

[11] Patent Number: 4,680,113

[45] Date of Patent: Jul. 14, 1987

[54] SIEVE ARRANGEMENT FOR RECOVERING CLEANING PARTICLES FROM A COOLING-WATER STREAM DOWNSTREAM OF A HEAT EXCHANGER

[75] Inventors: Klaus Eimer, Ratingen; Wolfgang Gebhardt, Duisburg, both of Fed. Rep. of Germany

[73] Assignee: Taprogge Gesellschaft mbH, Dusseldorf, Fed. Rep. of Germany

[21] Appl. No.: 718,825

[22] Filed: Apr. 2, 1985

Related U.S. Application Data

[63] Continuation of Ser. No. 491,034, May 3, 1983, abandoned.

[30] Foreign Application Priority Data

May 3, 1982 [DE] Fed. Rep. of Germany ....... 3216443

[51] Int. Cl.⁴ .............................................. B01D 35/18
[52] U.S. Cl. ..................................... 210/181; 165/95;
210/306; 210/328; 210/451
[58] Field of Search ........................... 15/3.51; 165/95;
210/181, 450, 451, 328, 446, 305, 306

[56] References Cited

U.S. PATENT DOCUMENTS

| | | | |
|---|---|---|---|
| 549,390 | 11/1895 | Patterson et al. | 210/305 |
| 658,339 | 9/1900 | Byrnes | 210/305 |
| 1,508,041 | 9/1924 | Winton | 210/328 |
| 1,726,328 | 8/1929 | Wieand | 210/306 |
| 3,135,574 | 6/1964 | Lenfant . | |
| 3,283,911 | 11/1966 | Reise | 210/446 |
| 3,481,475 | 12/1969 | Ruthrof et al. | 210/446 |
| 3,537,593 | 10/1968 | Ruthrof et al. | 210/409 |
| 4,056,474 | 11/1977 | Snouffer | 210/446 |
| 4,087,263 | 5/1978 | Schonmann, Jr. | 210/305 |
| 4,113,008 | 9/1978 | Treplin et al. | 165/95 |
| 4,135,574 | 1/1979 | Treplin et al. | 165/95 |
| 4,264,446 | 4/1981 | Fregeau | 210/446 |
| 4,305,822 | 12/1981 | Eimer et al. | 210/421 |
| 4,311,591 | 1/1982 | Eimer et al. | 210/421 |
| 4,343,703 | 8/1982 | Riedel | 210/446 |
| 4,351,387 | 9/1982 | Milia | 165/95 |
| 4,385,660 | 5/1983 | Koller | 165/95 |

FOREIGN PATENT DOCUMENTS

| | | | |
|---|---|---|---|
| 2645111 | 4/1978 | Fed. Rep. of Germany | 210/450 |
| 81476 | 11/1951 | Norway | 210/305 |
| 475494 | 4/1936 | United Kingdom | 210/340 |
| 0698636 | 11/1979 | U.S.S.R. | 210/446 |
| 0762929 | 9/1980 | U.S.S.R. | 210/446 |

*Primary Examiner*—Michael S. Marcus
*Attorney, Agent, or Firm*—Karl F. Ross; Herbert Dubno

[57] ABSTRACT

A device for recovering cleaning particles from a liquid stream after it has traversed a heat exchanger, comprises a pivotable inclined sieve and a baffle plate upstream of an outlet and the lower edge of the sieve for generating between the plate and the sieve a vortical flow which induces the particles to flow downwardly along the sieve to the outlet.

6 Claims, 7 Drawing Figures

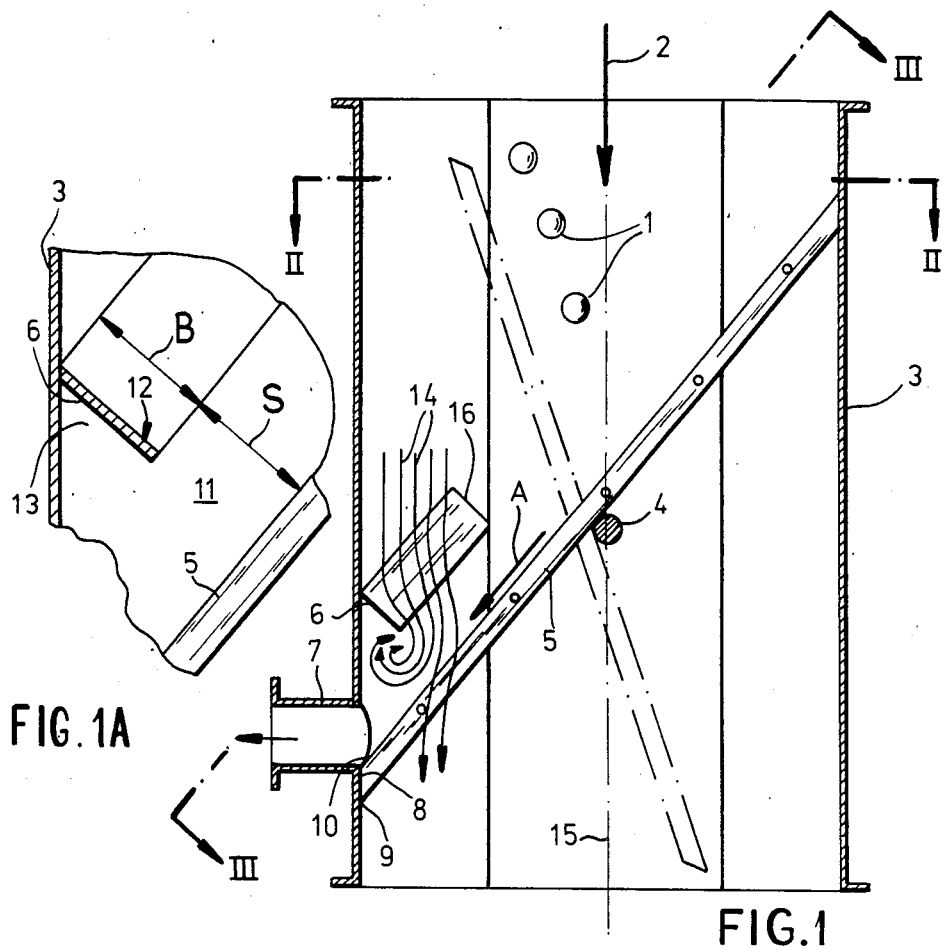
FIG.1A
FIG.1
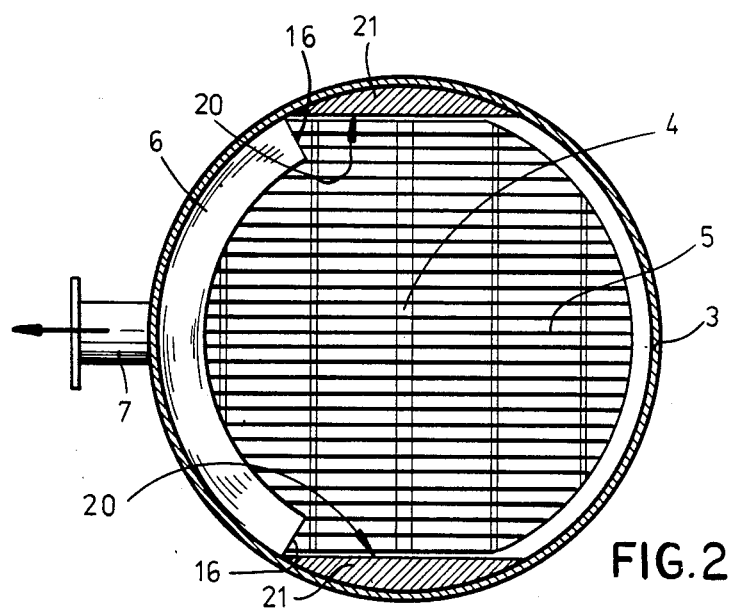
FIG.2

4,680,113

SIEVE ARRANGEMENT FOR RECOVERING CLEANING PARTICLES FROM A COOLING-WATER STREAM DOWNSTREAM OF A HEAT EXCHANGER

This is a continuation of co-pending application Ser. No. 491,034 filed on May 3, 1983, now abandoned.

CROSS REFERENCE TO RELATED APPLICATIONS

The present application is related to the following commonly assigned copending applications;
Ser. No. 385,066 filed 4 June 1982,
Ser. No. 402,564 filed 28 July 1982,
Ser. No. 417,373 filed 13 Sept. 1982,
Ser. No. 459,251 filed 17 Jan. 1983,
Ser. No. 486,363 filed 19 Apr. 1983,
Ser. No. 477,814 filed 22 Mar. 1983,
Ser. No. 478,065 filed 23 Mar. 1983, and
Ser. No. 477,862 filed 22 Mar. 1983, all with the exception of Ser. No. 385,066, now abandoned.

Reference may also be had to the following commonly owned patents which deal with similar subject matter:
U.S. Pat. No. 3,135,574
U.S. Pat. No. 4,113,008
U.S. Pat. No. 4,094,793
U.S. Pat. No. 4,311,591 and
U.S. Pat. No. 4,305,822.

FIELD OF THE INVENTION

Out present invention relates to the use of particles to clean tubes in, for example, heat exchangers and, more particularly, to a device for recovering cleaning particles from the cooling water downstream of a heat exchanger.

BACKGROUND OF THE INVENTION

To prevent the accumulation of scale and other deposits in the cooling tubes of a heat exchanger, especially in a power plant heat exchanger, it is known to introduce into the cooling water, cleaning particles sometimes referred to as cleaning bodies, balls, etc., which may be composed of a synthetic resin material or may be spongy or may have some other surface texture or structure which enables them, as they are entrained by the cooling water, to rub against the surfaces of the pipes which would normally develop accumulations to prevent such accumulations from developing or to remove those accumulations which have developed.

Downstream of the heat exchanger, means is provided to recover such cleaning particles from the water. The present invention is concerned with such means.

It is known to provide in a substantially cylindrical duct, traversed by the cooling water carrying the cleaning particles downstream of the heat exchanger, at least one swingable recovery sieve which may pivot about a transverse axis, i.e. an axis perpendicular to the direction of liquid flow. This sieve which can be made up of spaced-apart mutually parallel bars, generally lying orthogonal to this pivot axis, permits the passage of the particles so that the latter accumulate on the upper surface of the sieve and are guided downwardly to one side of the duct where an outlet is provided from which the particles can be removed, e.g. to be recirculated to a particle feeder at the upstream side of the heat exchanger.

Because the duct is generally vertical and the recovery sieve is inclined to the direction of liquid flow, it generally is of elliptical configuration and lies with its edges on a correspondingly elliptical seat upstream of which the guide elements can be provided to direct the flow onto the central portion of the sieve.

To permit the pivoting movement of the sieve, parts of the flow cross section cannot be formed with the sieve bars.

In other prior art structures, two such sieves can be provided in a gable or roof structure, i.e. the sieves can form an inverted V whereby each sieve is inclined downwardly and outwardly from, for example, a vertical median plane through the duct.

The particles, which are generally spheroidal, are thus filtered from the water traversing the sieve structure and normally will roll downwardly along the sieves. However, while the sieves serve to remove the cleaning particles, in practice they also collect solids which may be scoured by the particles from the pipes, such contaminants tending to accumulate to the sieves.

To remove these particles and contaminants which may be caked up on the sieve and prevent or limit further passage of water, the sieve may be made tiltable so that it can be swung into a position in which the bottom of the sieve is presented to the upstream side and hence the water may wash such contaminants from the surface of the sieve which, in the position into which the sieve is swung, has the contaminant accumulating surface turned downstream.

For the cleaning of the grate or sieve, the supply of cleaning particles is briefly interrupted.

The guide elements previously mentioned are intended to ensure that, in the recovery position of the sieve, the particles can flow and indeed are induced to flow toward the particle outlet and that the movement of the particles on the sieve surface in the region of the outlet is not restricted by impurities entrained by the water and which without such means could detrimentally accumulate on the sieve.

The guide element usually used heretofore was a solid three-dimensional guide body having a crescent shape resembling a slice of a melon which was fixed equidistantly from the sieve seat on the housing wall.

The ends of this guide body were generally pointed.

The space beneath the upstream surface of the guide body was not integrated with the flow. This space, indeed, was generally occupied by part of the guide body or its support.

As a consequence, over a significant portion of the region of the sieve in which the guide body was intended to be effective to generate a movement-promoting effect on the particles, no such effect was noticeable. Indeed, even directly below the guide body, accumulations were found to develop which could impede the movement of the particles along the sieve and from the outlet. Thus, in spite of the guide members utilized heretofore, frequently the discharge of the particles was prevented or limited requiring interruption of the operation of the device.

OBJECTS OF THE INVENTION

It is the principal object of the present invention to provide an improved device for separating cleaning particles from the cooling water downstream of a heat exchanger in a power plant.

Another object of this invention is to extend the particles of the above-mentioned copending applications and to provide a device for recovering cleaning particles as described which, however, is free from the disadvantages enumerated.

Still another object of this invention is to provide an improved pivotal-sieve particle-recovery unit in which obstruction of the outflow of the cleaning particles is prevented.

SUMMARY OF THE INVENTION

These objects and others which will become apparent hereinafter are attained, in accordance with the present invention, with a guide element which is disposed above the lowermost portion of the sieve in the particle-collecting position thereof, along the wall of the duct and upstream of this portion of the sieve and therefore upstream of the outlet for the particles, which is in the form of a guide plate inclined downwardly and inwardly, i.e. inwardly in the direction of the flow of the liquid so that a wedge-shaped chamber is defined beneath the overhung formed by the guide plate which intensifies the transport effect upon the particles.

This wedge-shaped compartment defined between the wall of the duct and the guide plate converges upwardly in the direction opposite the direction of flow.

Apparently the guide plate directs the liquid inwardly as it flows over the guide plate to establish a low pressure compartment below the guide plate into which a vortex of liquid is drawn, this vortex having a flow pattern which parallels the desired movement of the particles along the sieve plate. This reduced-pressure compartment can extend over the entire length of the particle discharge gap between this plate and the sieve plate and promotes particle transport on the sieve plate. The vortex or turbulence which is thereby created also has the effect of freeing the region of the sieve plate in the flow shadow of the guide plate from any contaminants which may tend to collect and to obstruct the movement of the particles along the sieve plate to the outlet.

The specific configuration of the guide plate can depend upon the flow conditions and the diameter of the duct. For example, if the duct is of comparatively small diameter, the guide plate can be a simple planar sheet metal structure. Frequently, however, it is desirable to form the guide plate as a simple curved piece of sheet metal whose radius of curvature intersects the duct axis. The curvature in this case is preferably in only one plane.

Preferably the curvature or, stated otherwise, the arcuate shape of the guide plate, substantially follows the elliptical sieve seat and the plate is parallel thereto. To ensure an intensive vortex or turbulence formation, it has been found to be advantageous to make the deflecting plate of the same width over its entire length.

However, it has also been found to be effective to reduce the width of the plate outwardly from a location directly above the outlet for the particles. It is also possible, in accordance with the invention, to maintain a uniform gap width between the recovery sieve and the deflecting plate in the particle recovery position of the latter, measured along the length of the deflector plate. The width of the guide plate and the gap width can be substantially equal or can conform to one another over the length of a plate.

When the guide plate has the configuration of a narrow sheet metal section, it can have two projecting end regions which can be connected to the housing with closure elements which prevent penetration of water between the guide plate and the wall of the housing or duct and hence a bypassing of the guide plate into the compartment.

To generate in the region of the discharge port for the particles, a flow component which runs reasonably directly toward the particle outlet and is undisturbed, the deflector plate can be provided in the region of this outlet orthogonal to the main flow direction. The same result can be achieved by forming the deflector plate from two plate sections which, directly upstream of the particle outlet, define a bend, corrugation or ridge. It has also been found to be advantageous to fit the guide or deflecting gate in a slit in the housing or to provide a guideway so that the width of penetration of this plate into the liquid path can be adjusted. In the latter case, a corresponding servomechanism or other device can be provided for controlling the effective width of the deflecting plate in accordance with the varying operation conditions of the system.

In accordance with the present invention, the orientation of the guide plate with respect to the sieve plane is basically arbitrary and in general it is merely necessary that the guide plate is inclined inwardly toward the sieve plate. However, optimum results are obtained with respect to the transport effect and the removal of impurities from the portion of the sieve plate in the flow shadow of the deflecting plate when the deflecting plate is substantially orthogonal or perpendicular to the plane of the sieve when the latter is in its particle recovery position.

The arrangement of the present invention has the important advantage that it ensures practically over the entire length of the deflecting plate an intensive transport effect upon the particles which are collected from the flowing liquid of the sieve. These particles are generally urged by the flow components of the vortices which develop into the particle outlet. Simultaneously the vortices appear to preclude any substantial sedimentation of contaminants upon the sieve plate at least in the region where the vortices and the transport effects are most pronounced so that here as well the impediment to discharge of particles is minimized.

BRIEF DESCRIPTION OF THE DRAWING

The above and other objects, features and advantages of the present invention will become more readily apparent from the following description, reference being made to the accompanying drawing in which:

FIG. 1 is an axial section through a particle recovery unit in accordance with the present invention;

FIG. 1A is a detail view of the region of the deflector plate in accordance with the invention;

FIG. 2 is a section taken along the line II—II of FIG. 1;

SPECIFIC DESCRIPTION

Figure 3:
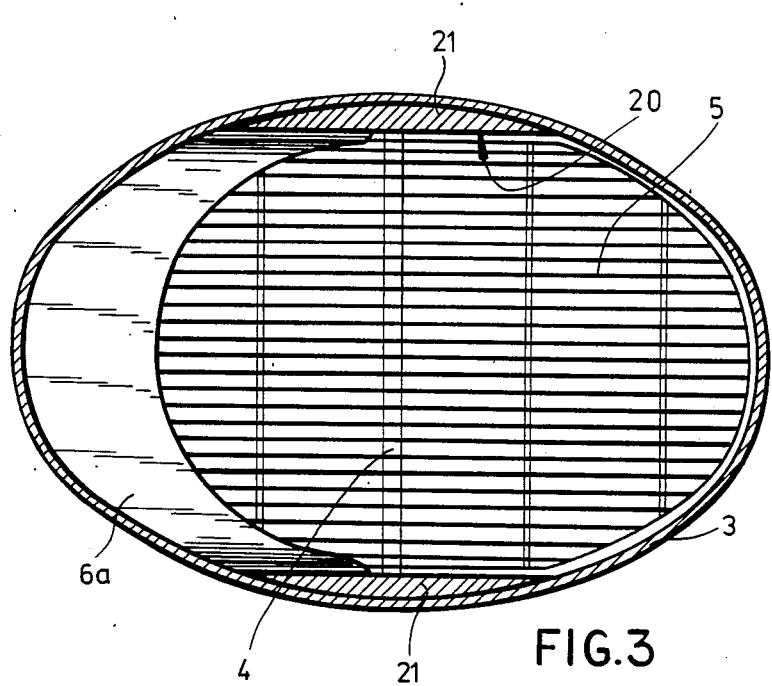
FIG. 3 is a section taken along the line III—III of FIG. 1.

From FIGS. 1 through 3, it will be apparent that cleaning particles, generally scrubbing balls 1, which may have been added to a cooling water stream, upstream of a heat exchanger, can be recovered from the cooling water and, if desired, recycled to the upstream location utilizing the device illustrated. The position of the device with respect to the heat exchanger has not been illustrated except that it may be noted that the water outflow from the heat exchanger is represented by the arrow 2, that this outflow passes through a vertical duct 3, also called a housing, and that the recycled particles are withdrawn by a lateral fitting 7 from the duct.

Thus, the basic elements of the apparatus are a substantially cylindrical housing 3, traversed by the water in flow direction 2, at least one sieve 5, here shown to be a grate formed from parallel rods or bars, which is swingable about an axis defined by a pivot 4 running perpendicular to the flow direction and, in this case, a horizontal pivot, a guide or deflector element 6 disposed upstream of the particle-removal location at the bottom edge of the sieve, and the particle outlet or discharge fitting 7.

In practical terms, the sieve can have an elliptical outline whose lower edge 8 rests against the seat 9 which is also elliptical and formed in the housing 3. At the deepest or lowest point 10, the particles which run along the bars of the sieve downwardly, converge toward the outlet fitting 7.

The deflector 6 projects inwardly from the wall of the housing above this seat 9 and hence above the point 10 at which the particles are discharged.

The deflector 10 defines a gap 11 through which the particles, held back from entrainment with the water as the stream traverses the sieve, can pass downwardly in the direction of the arrow A toward the outlet 7.

When accumulations on the sieve from contaminants scoured from the heat exchanger tubes, can create a problem, the same can be tilted into its dot-dash line position shown in FIG. 1, and wherein after the supply of cleaning particles has been cut off, the water can entrain the contaminants from the surface of the sieve which is now turned downstream. When the particles have been removed, the sieve is replaced in its solid line position.

According to the invention, the deflector element or baffle 6 is a sheet metal member fixed on the inner surface of the wall above the lower edge of the sieve in its operative position so that an upwardly and outwardly converging wedge-shaped compartment is formed at 13. This compartment is open downwardly toward the sieve so that it lies in the flow shadow of the water moving in the direction of arrow 2 and strong vortices are established as represented by the flow lines 14. As will be apparent, these vortices have flow components in the direction of arrow A and thus promote the movement of the particles toward the outlet 7 and by the high velocity turbulences which are produced, prevent contaminants from settling on the sieve in this region and from impeding the movement of the particles.

From FIGS. 1 through 3, moreover, it will be apparent that the sheet metal member 6 can be a simply curved strip of sheet metal of constant width B measured from the wall of the housing to the free edge 12. This width B should be approximately equal to the width S of the gap 11 and both may be constant.

The baffle 6 has free ends 16 which can extend to a pair of filler bodies 21 flanking the sieve and having inward straight edge regions orthogonal to the pivot axis 4 of the sieve. As shown in FIG. 3, where these free ends are slightly modified, they can also be secured to the bodies 21 and thereby prevent bypassing of the baffle in the region of the free ends thereof.

Figure 3A:
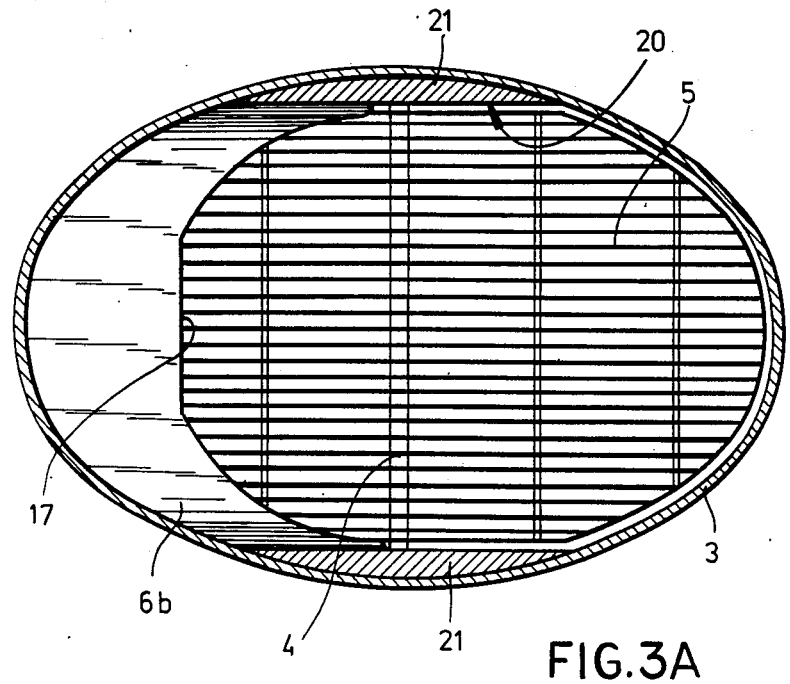
FIGS. 3A and 3B are views similar to FIG. 3 illustrating other embodiments of the invention.
Figure 3B:
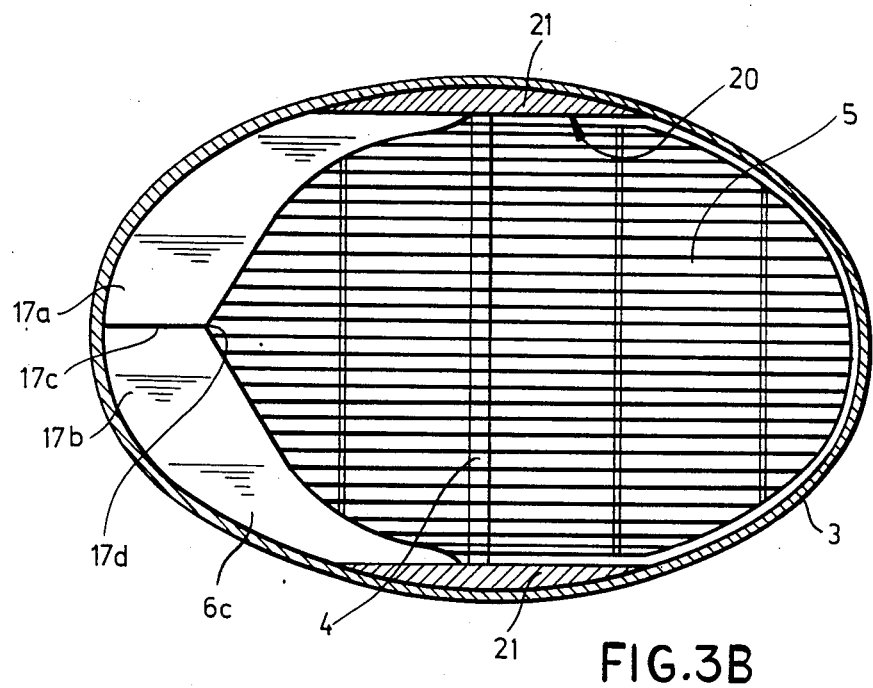

FIG. 3 also shows that the baffle 6a can have a continuously decreasing width outwardly from the center while, in FIG. 3A, the baffle 6b is shown to have a horizontal rectilinear central portion at 17 whereas the baffle 6c of FIG. 3B has a pair of sections 17a and 17b inclined upwardly from a ridge 17c and has an indented portion 17d defining the free edge.

Figure 4:
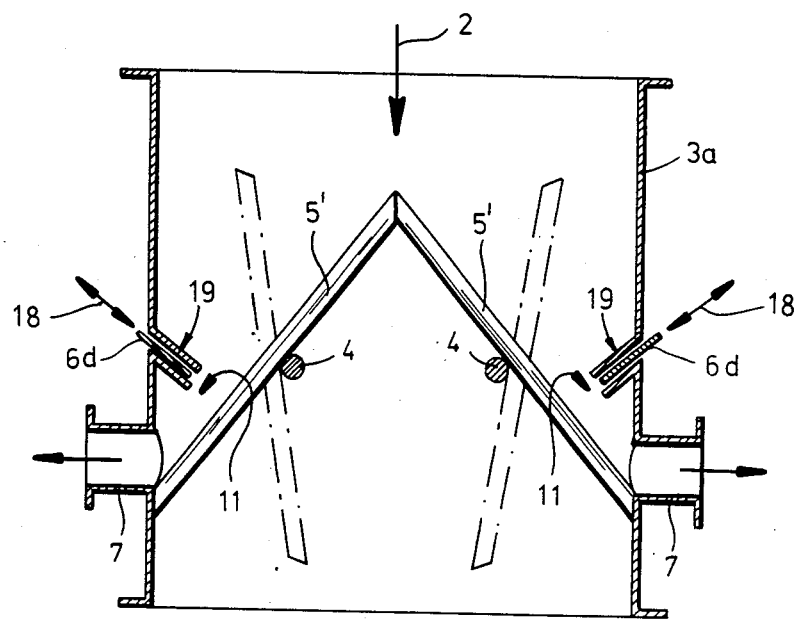
FIG. 4 is a diagrammatic section similar to FIG. 1 illustrating yet another embodiment of the invention.

In the embodiment of FIG. 4, the sieves 5' together define a coping or roof-like construction in their operative positions but otherwise cooperate with guide elements 6d of the type described in connection with FIG. 1. Here, however, the deflector elements are slidable in guides 19 in the wall of the housing 3a as represented by the double-headed arrows 18 to adjust the flow shadow and hence the magnitude of the turbulence which is generated in accordance with the flow parameters.

We claim:

1. An apparatus for recovering cleaning particles from a liquid stream downstream of a heat exchanger, said apparatus comprising:

a cylindrical duct,
  traversed by a fluid stream containing particles therein in a first flow direction along a path of the stream, and forming a housing having a housing wall formed with an interior wall surface surrounding an axis of the duct;

at least one sieve having a front surface and a back surface and having along at least a part of its periphery an elliptical configuration, said sieve being pivotally mounted in said housing for swinging movement, about an axis transverse to said flow direction, between (i) an operative position wherein said sieve is inclined to said flow direction with said front surface generally facing upstream for contact thereof by said particles in said stream to cause said particles to move along said sieve to a downstream region thereof and toward the interior wall surface of said housing, and (ii) an inoperative position wherein said sieve is inclined to said flow direction with said back surface generally facing upstream for reverse flow of liquid through said sieve to cause contaminants to be removed from said front surface of said sieve;

a means fastened to and cooperating with said interior wall surface for forming an elliptical seat having an elliptical contour for said part of said periphery of said sieve, said elliptical seat being located in a position enabling engagement of said seat by said sieve upon the latter being swung to said operative position thereof;

a particle outlet opening into said housing through the housing wall just upstream of said location of said seat for permitting particles moving along said sieve to exit from said housing; and a deflector plate projecting from said interior wall surface of said housing into the path of said stream, said plate being located upstream of and spaced from both said outlet and said seat, said plate being a curved sheet-metal member following the elliptical contour of said seat and having a simple curvature with a radius of curvature intersecting the axis of said duct, said deflector plate having upstream and downstream planar surfaces, a first edge connected to said interior wall surface along a contour complementary to said elliptical seat and a free end extending toward a center of said duct and terminating at a point downstream of the connection of said first edge of said deflector plate so that said deflector plate is inclined toward said first flow direction, said upstream and downstream planar surfaces lying in a plane which is perpendicular to the surfaces of said sieve when said sieve is in said operative position, said plate defining with the portion of said wall proximate to said downstream surface of said plate a wedge-shaped compartment open toward said sieve and converging outwardly away from the latter for inducing vortex formation between said plate and said sieve along said downstream planar surface for inducing the movement of said particles along said front surface of said sieve to said outlet.

2. The apparatus defined in claim 1 wherein said plate is of constant width over its entire length.

3. The apparatus defined in claim 2 wherein said plate defines a gap with said sieve in said operative position of said sieve, said gap being of substantially constant width over its entire length and being approximately equal in width to the width of said plate.

4. The apparatus defined in claim 1 wherein said plate has end regions spaced from said interior wall surface of said housing, said apparatus further comprising filler bodies disposed between said end regions and said housing for preventing the flow of said liquid around said end regions into said compartment.

5. The apparatus defined in claim 1 wherein said plate is formed from two plate segments having an indentation between them.

6. The apparatus defined in claim 1 wherein a pair of such sieves is provided in said housing, each of said sieves being associated with a respective particle outlet and a respective plate, and each plate projecting into said stream upstream of the respective outlet to define a respective compartment.

* * * * *